(12) United States Patent
Darolles et al.

(10) Patent No.: US 10,547,082 B2
(45) Date of Patent: Jan. 28, 2020

(54) CROSSLINKED POLYMER ELECTROLYTE

(71) Applicant: California Institute of Technology, Pasadena, CA (US)

(72) Inventors: Isabelle Darolles, Azusa, CA (US); Simon Jones, Azusa, CA (US); Nanditha Nair, Azusa, CA (US)

(73) Assignee: California Institute of Technology, Pasadena, CA (US)

( * ) Notice: Subject to any disclaimer, the term of this patent is extended or adjusted under 35 U.S.C. 154(b) by 991 days.

(21) Appl. No.: 14/768,074

(22) PCT Filed: Feb. 14, 2013

(86) PCT No.: PCT/US2013/026158
§ 371 (c)(1),
(2) Date: Aug. 14, 2015

(87) PCT Pub. No.: WO2014/126570
PCT Pub. Date: Aug. 21, 2014

(65) Prior Publication Data
US 2015/0380767 A1    Dec. 31, 2015

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0082* (2013.01)

(58) Field of Classification Search
CPC ... C08F 2/48; H01M 10/052; H01M 10/0525; H01M 10/0565; H01M 2300/0082
See application file for complete search history.

(56) References Cited

U.S. PATENT DOCUMENTS

| | | | |
|---|---|---|---|
| 4,889,659 A | 12/1989 | Genies et al. | |
| 5,484,670 A | 1/1996 | Angell et al. | |
| 7,033,706 B2 | 4/2006 | Mori et al. | |
| 7,067,606 B2 | 6/2006 | Mather et al. | |
| 9,166,249 B2 | 10/2015 | Darolles et al. | |
| 9,331,360 B2 | 5/2016 | Weiss et al. | |
| 2004/0024098 A1* | 2/2004 | Mather | C08G 18/3893 524/268 |
| 2004/0076886 A1* | 4/2004 | Mori | H01B 1/122 429/306 |
| 2007/0042266 A1 | 2/2007 | Oh et al. | |
| 2007/0197362 A1 | 8/2007 | Sakata et al. | |
| 2007/0212615 A1 | 9/2007 | Jost et al. | |
| 2008/0020284 A1 | 1/2008 | Michot et al. | |
| 2008/0209876 A1* | 9/2008 | Miller | G11C 13/0009 55/522 |
| 2010/0203144 A1* | 8/2010 | Laurencin | A61L 27/04 424/489 |

FOREIGN PATENT DOCUMENTS

| | | |
|---|---|---|
| EP | 1199764 | 4/2002 |
| EP | 1213778 A2 | 6/2002 |
| EP | 1548751 A1 | 6/2005 |
| EP | 1548751 | 6/2006 |
| EP | 2136431 A1 | 12/2009 |
| JP | H10-340618 | 12/1998 |
| JP | 2002-175837 | 6/2002 |
| JP | 2003-217666 | 7/2003 |
| JP | 2010-003694 | 1/2010 |
| KR | 10-2005-057462 | 6/2005 |
| WO | WO 2000/072399 | 11/2000 |
| WO | WO 2004/027789 | 4/2004 |

OTHER PUBLICATIONS

Notice of Reasons for Refusal dated Nov. 22, 2016, corresponding to Japanese Patent Application No. 2015-557979.
Extended European Search Report dated Nov. 22, 2016, corresponding to European Patent Application No. 13875093.0.
First Office Action dated Sep. 21, 2016, for Chinese Patent Application No. 201380072795.0.
Bates et al. (2000) "Thin-film lithium and lithium-ion batteries," Solid State Ionics. 135:33-45.
Evans et al. (Jun. 24, 1987) "Electrochemical measurement of transference numbers in polymer electrolytes," Polymer. 28.
Kim et al. (Nov. 10, 2009) "UV cross-linked, lithium-conducting ternary polymer electrolytes containing ionic liquids," Journal of Power Sources. 195.6130-6137.
Tsuda et al. (2002) "A highly conductive composite electrolyte consisting of polymer and room temperature molten fluorohydrogenates," Solid State Ionics. 149:295-298.
International Preliminary Report on Patentability corresponding to International Patent Application No. PCT/US2013/026158, dated Aug. 18, 2015.
International Search Report with Written Opinion corresponding to International Patent Application No. PCT/US2013/026158, dated Feb. 14, 2013.
First Office Action dated Sep. 21, 2016, corresponding to Chinese Patent Application No. 201380072795.0.
Rupp et al. (Jun. 2008), "Polymer electrolyte for lithium batteries based on photochemically crosslinked poly( ethylene oxide) and ionic liquid," European Polymer journal 44 (2008) 2986-2990.
Koh et al. (Nov. 2009), "Azide-induced crosslinking of electrolytes and its application in solid-state dye-sensitized solar cells," Solar Energy Materials & Solar Cells 94 (2010) 436-441.

(Continued)

*Primary Examiner* — Adam A Arciero
(74) *Attorney, Agent, or Firm* — Leydig, Voit & Mayer, Ltd.

(57) ABSTRACT

A composite electrolyte can include a crosslinked polymer formed from telechelic precursor polymers having at least two photoactivatable end functional groups and a molecular weight before crosslinking of between about 1,000 and 1,000,000 Daltons (Da); and a lithium (Li) salt. Electrochemical cells and batteries including such electrolytes are also disclosed, along with various methods of manufacture.

15 Claims, 3 Drawing Sheets

(56) References Cited

OTHER PUBLICATIONS

Partial Supplementary European Search Report dated Aug. 18, 2016, corresponding to European Patent Application No. 13875093.0.

Wu et al. (Feb. 2009), "Poly(acrylic acid)-Bearing Photoreactive Azido Groups for Stabilizing Multilayer Films", Langmuir 2009, 25, 2949-2955.

Agrawal et al. (Oct. 2008), "Solid polymer electrolytes: materials designing and all-solid-state battery applications: an overview," J. Phys. D: Appl. Phys. 41 (2008) 223001 (18pp).

Communication pursuant to Article 94(3) EPC dated Dec. 22, 2017, for European Patent Application No. 13875093.0.

Second Office Action dated Jun. 19, 2017, for Chinese Patent Application No. 201380072795.0.

Office Action corresponding to Korean Patent Application No. 10-2015-7023941, dated Mar. 18, 2019.

\* cited by examiner

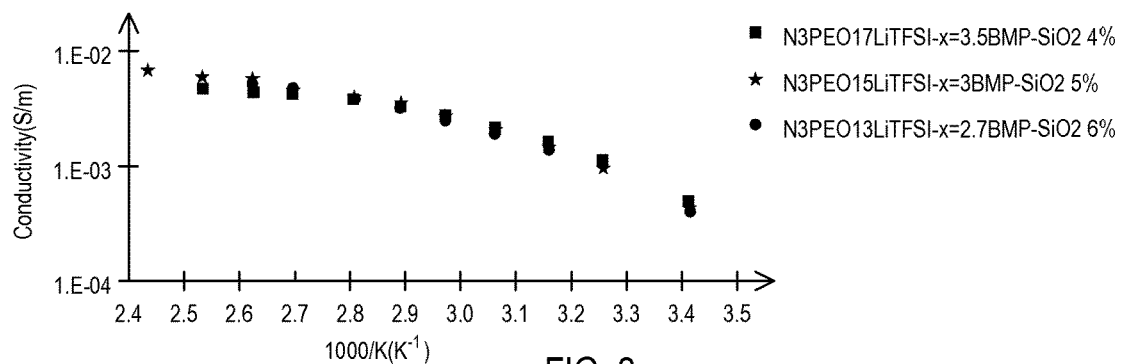
FIG. 3
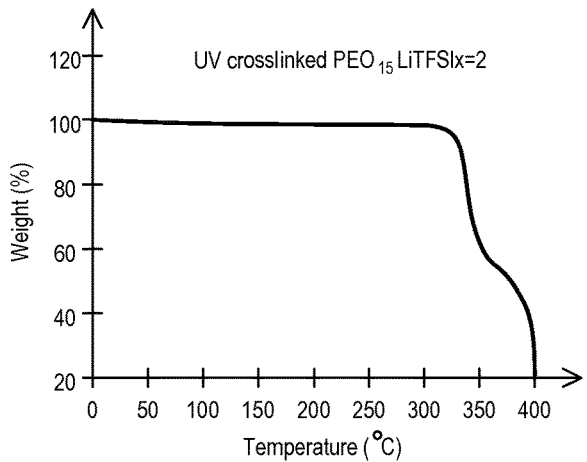
FIG. 4
| Electrolyte | $T_{Li+}$ |
|---|---|
| $PEO_{20}$ LiTFSIx=4-BMP-TFSI | 0.191 |
| $PEO_{17}$ LiTFSIx=3.5BMP-TFSI | 0.274 |
| $PEO_{17}$ LiTFSIx=3BMP-TFSI | 0.370 |
FIG. 5
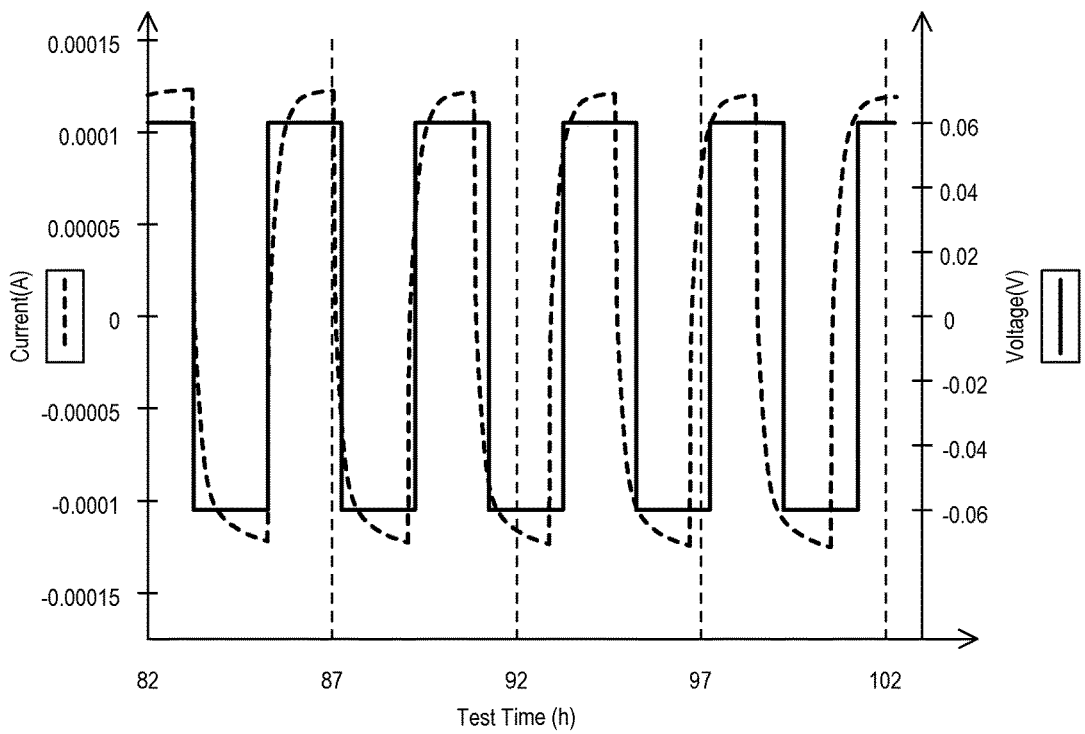
FIG. 6

CROSSLINKED POLYMER ELECTROLYTE

CROSS-REFERENCE TO RELATED APPLICATIONS

This application is a U.S. National Stage Application under 35 U.S.C. § 371 of International Application No. PCT/US2013/026158, filed Feb. 14, 2013, which is hereby incorporated by reference in its entirety.

TECHNICAL FIELD

The present disclosure relates generally to polymer based electrolytes, and more particularly, cross-linked polymer electrolytes suitable for use in electrochemical applications, including cells or batteries, and methods of forming such electrolytes, cells, or batteries are described.

BACKGROUND

A battery generally includes a positive electrode (which is a cathode during discharge), a negative electrode (which is an anode during discharge) and an electrolyte for ion transport between the electrodes. Because of its low electrochemical oxidation/reduction potential and light weight, lithium (Li) is commonly used in both primary and rechargeable battery systems. Rechargeable batteries based Li-ion polymer cells are commercially available and widely used.

Li-ion battery systems generally include large amounts of liquid organic solvents in the electrolyte. The use of liquid organic solvents has associated safety concerns arising from their high degree of volatility and flammability, particularly in large format batteries. In addition, in the event of damage or corrosion of a battery, liquid electrolytes can leak and spread, causing further damage to other battery components or nearby equipment. In contrast, Li-ion polymer, or Li polymer batteries include a solid-polymer electrolyte rather than an organic solvent electrolyte, which mitigates many of the safety concerns associated with Li-ion batteries.

Both Li-ion and Li-ion polymer batteries can employ a graphite/Li intercalated material as the anode material. This limits the energy density of these batteries because the intercalated anode has only about 10% of the capacity of Li metal itself (~370 mAh/g vs. ~3800 mAh/g, respectively). Li metal cannot practically be used in batteries in combination with an organic electrolyte, due to safety concerns with regards to dendrite formation and the reactivity of Li metal with the organic solvent. As described in *Applications of Electroactive Polymers*, B. Scrosati (ed), Chapman and Hall (1993) and J. B. Bates et al., *Solid State Ionics*, 135 (2000) 33-45, these issues can be resolved by using a solid electrolyte (e.g., a ceramic such as LiPON, or a high molecular weight polyethylene oxide (PEO) doped with Li salt) of greater mechanical strength than liquid or gel-polymer systems. However, such solid electrolytes often have significantly lower ionic conductivity at room temperature than the alternatives, limiting their use to, e.g., high temperature batteries, thin film cells or other specialized applications.

Higher conductivities using solid polymer electrolytes may be achieved through the introduction of small molecule "plasticizers," such as organic solvents or ionic liquids. However, safety issues, similar to those described above in connection with Li-ion batteries, arising from flammability or mechanical instability, may result from the use of such solvents or liquids. High molecular weight PEO-containing electrolytes may be modified to form a network using processes such as UV-initiated radical crosslinking and electron beam crosslinking, whereby these processes introduce bonds between polymer chains along the length of the chain to create an electrolyte of greater mechanical strength. See, for example, Kim et al., *J. Power Sources*, 195 (2010) 6130-6137. However, these electrolytes exhibit limited ionic conductivities that may be attributed, at least in part, to the random nature of the crosslinking reaction. In addition, residual photoinitiator species (for example, benzophenone) contained in such crosslinked electrolytes may be undesirable for long-term stability and electrochemical performance. FIG. 1A is a diagram showing how non-functionalized (i.e., non-telechelic) polymer 102 is subject to UV-initiated or electron-beam cross-linking 104 to essentially random crosslinking 106.

BRIEF DESCRIPTION OF DRAWINGS

FIG. 3 illustrates the conductivity of several exemplary compositions of photocross-linked telechelic diazido-PEO, Li salt, ionic liquid and $SiO_2$ nanoparticles;

FIG. 4 illustrates thermogravimetric analysis of a representative electrolyte formed from crosslinking diazido-PEO in the presence of Li salt;

FIG. 5 illustrates the Li transference number of three exemplary compositions of cross-linked telechelic diazido-PEO, Li salt and ionic liquid composite electrolytes; FIG. 6 illustrates the stable plating/stripping behavior of Li/electrolyte/Li symmetric cells made with electrolytes described in accordance with embodiments;

DETAILED DESCRIPTION OF THE EMBODIMENTS

Improved polymer electrolytes for use in electrochemical systems, including fuel cells, flow cells, separators and membranes, electrical batteries and cells; and methods of forming the electrolyte, cell, and battery are described. In certain embodiments, the electrolyte described herein exhibits relatively high ionic conductivity of >0.1 mS/cm at 300K (with >0.3 mS/cm being preferred), high mechanical stability, and high thermal stability, and allows for use of Li metal as an anode material. Advantageously, in certain embodiments the electrolyte supports battery recharging for hundreds of cycles without shorting, and can enable the operation of cells at high temperatures (e.g., from room temperature up to about 160° C.).

In embodiments, an anode can include Li, which may be in the form of Li metal, a Li metal alloy, or a Li intercalated material, such as Li intercalated with graphite or carbon. A cathode can be formed of a single element or a composition, and can be an oxide, phosphate or other intercalating or insertion composition that has a higher potential than the anode.

A battery according to this disclosure includes one or more electrochemical cells as described herein and may additionally include a first electrode coupled to an anode of one or more electrochemical cells, a second electrode coupled to a cathode of one or more electrochemical cells, and a casing or housing encasing one or more electrochemical cells. The battery may be configured as a primary battery, wherein the electrochemical reaction between the anode and cathode is substantially irreversible or as a secondary battery, wherein the electrochemical reactions between the anode and cathode are substantially reversible.

The electrochemical cells and batteries described herein have a wide temperature window of operation enabled by the high conductivity and high mechanical stability of the electrolyte described. These electrochemical cells and batteries may be usefully employed for consumer electronics applications and electric transportation (0-60° C.), and also for higher temperature applications (60-160° C.) such as oil and gas downhole and military applications.

In accordance with additional embodiments of the invention, an electrochemical cell includes an anode, a cathode, and an electrolyte, including a telechelic crosslinked polymer, interposed as a thin layer between the anode and the cathode. During operation of a cell, Li cations (Li+) in the Li-conducting electrolyte move from the cathode to the anode during discharge and from the anode to the cathode during the charging of the cell.

Figure 1A:
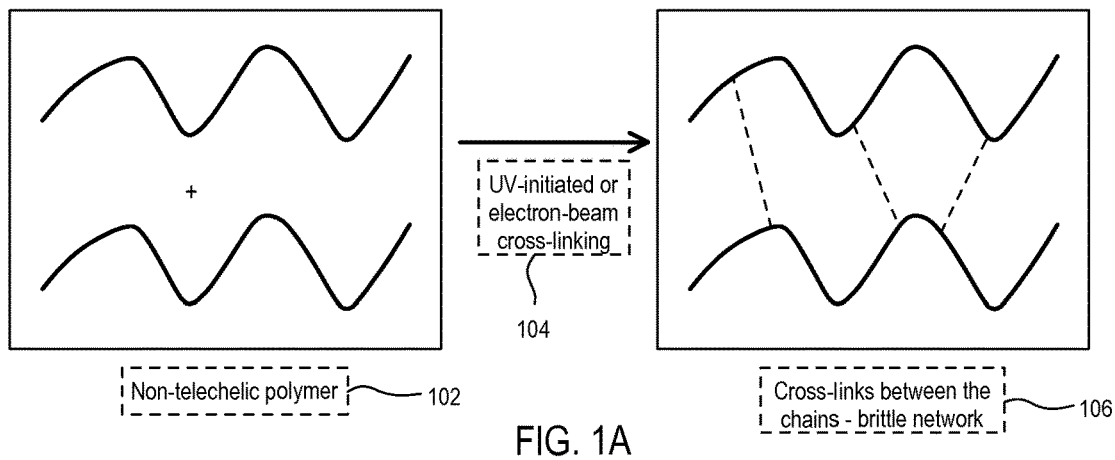
FIGS. 1A and 1B illustrate the differences between radiation-induced cross-linking of non-functionalized polymer chains and photo-activated cross-linking of telechelic polymer chains functionalized with suitable photosensitive functional groups.
Figure 1B:
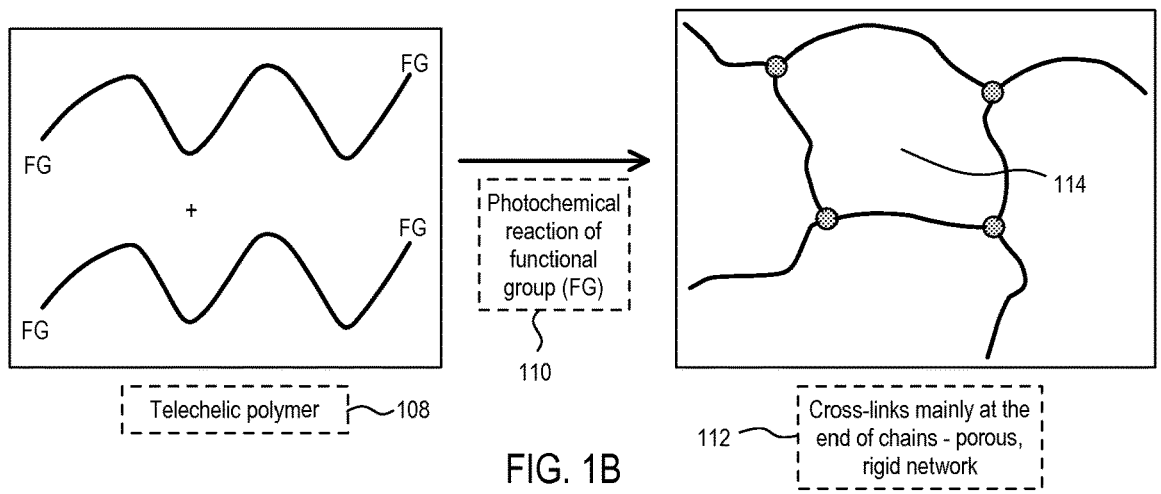

According to embodiments, an electrolyte can include one or more crosslinked polymers, with a base or precursor polymer formed to be a telechelic polymer that is end-functionalized with a photosensitive group. A telechelic polymer or oligomer is a prepolymer capable of entering into further polymerization or other reactions through its reactive end-group. Reactive end group crosslinking can be achieved by irradiation of the telechelic polymer so that the photosensitive group undergoes photo-activated cross-linking reactions. Advantageously, after crosslink such telechelic polymers can retain an open "nanopore" structure that permits high mobility ion transport, while still having desirable mechanical properties, including low flowability. According to embodiments, this "nanopore" structure can have an approximate diameter between 1 nm and 1 μm. In certain embodiments, limited crosslinking between chains rather than solely through polymer end groups is also contemplated. Polymer electrolytes formed from telechelic polymers may additionally include Li salts, organic or ionic liquid solvents, and inert components to increase mechanical strength and/or conductivity such as oxide nanoparticles. FIG. 1B is a diagram showing a telechelic polymer 108 can be is subject to a reaction (e.g., photochemical reaction of its functional group) 110 to form a cross-linked structure with nanopores 112.

In accordance with various exemplary embodiments, an electrolyte includes a polymer formed of crosslinked low to medium molecular weight precursor polymer. In accordance with various aspects of these embodiments, the precursor polymer can have a molecular weight of about 1,000 to about 10,000,000, or about 1,000 to about 1,000,000, or about 1,000 to about 100,000, or about 1,000 to about 50,000 Daltons. The molecular weights of the polymer materials stated herein are the molecular weights of the telechelic polymer material prior to crosslinking. Precursor polymers can have substantially the same molecular weight, be formed to have a range of molecular weights, or be blends of differing molecular weight. In addition, to improve mechanical, electrical, or chemical properties, mixtures can also include polymers that have not been end-functionalized, branching or multifunctionalized polymers, polymers that act as binders, very large molecular weight (>1,000,000 Daltons) with or without functionalization, and/or very small molecular weight (<1000 Daltons) with or without functionalization. The electrolyte may additionally include Li salts, and/or an ionic liquid, and/or oxide nanoparticles. For example, the electrolyte may include crosslinked polymer material (e.g., of a low to medium molecular weight), Li salts, an ionic liquid, and silicon oxide nanoparticles.

Suitable Li ion salts include, for example, Li hexafluorophosphate ($LiPF_6$), Li hexafluoroarsenate ($LiAsF_6$), Li perchlorate ($LiClO_4$), Li tetrafluoroborate ($LiBF_4$), Li trifluoromethanesulfonate ($LiCF_3SO_3$), Li trifluoroacetate ($LiCF_3CO_2$), Li tetrachloroaluminate ($LiAlCl_4$), Li bis(trifluoromethanesulfonyl)imide ($Li[CF_3SO_2]_2N$, LiTFSI), Li bis(fluorosulfonyl)imide ($Li[FSO_2]_2N$, LiFSI), Li bis(oxalato)borate ($Li[C_2O_4]_2B$, LiBOB), Li iodide (LiI), Li bromide (LiBr), Li chloride (LiCl) and Li fluoride (LiF). However, any Li salt that provides a sufficient, stable supply of Li cations to carry current within the battery is within the scope of the present disclosure.

Useful solvents are organic liquids, ionic liquids, and/or combinations thereof that are liquid at around room temperature and are capable of dissolving the aforementioned Li salts to molar concentrations of 0.01 M and above, or concentrations between 0.1 and 3 M. By way of very particular examples, not intended to be limiting to this disclosure, the ionic liquid solvent may include 1-ethyl-3-methylimidazolium bis(trifluoromethanesulfonyl)imide (EMI-TFSI), N-methyl,N-propylpiperidinium bis(trifluoromethanesulfonyl)imide (MPP-TFSI), N-butyl, N-propylpyrrolidinium bis(trifluoromethanesulfonyl)imide (BMP-TFSI), N-butyl, N-propylpyrrolidinium tris(pentafluoroethyl)trifluorophosphate (BMP-FAP) and N-butyl, N-propylpyrrolidinium bis(fluorosulfonyl)imide (BMP-FSI).

As will be appreciated, certain embodiments can include additive particles that can increase mechanical strength, electrical conductivity, or other desirable physical or electrochemical properties of a cell or battery. Such additive particles can include electrochemically-inactive oxides such as $SiO_2$, $Al_2O_3$ and $ZnO_2$. In particular embodiments, the particle size is selected such that at least one dimension is less than 1 μm.

In accordance with additional embodiments, a method of forming an electrolyte includes forming a crosslinked polymer by photo-activated reactions as described herein. The polymer may be exposed to an ionic liquid, Li salt and, optionally, oxide particles, during or subsequent to the crosslinking, to form a composite polymer electrolyte. For example, an electrolyte may be formed by providing a precursor polymer, substituting the precursor polymer on one or more terminal ends with a functional group to form an intermediate polymer, forming a crosslinked polymer from the intermediate polymer, dissolving a Li salt in an ionic liquid solvent to form an ionic liquid solution, exposing the crosslinked polymer to the ionic liquid solution and, optionally, oxide nanoparticles, and swelling the polymer in the ionic liquid solution to form the composite electrolyte. Alternatively, an electrolyte may be formed by providing a precursor polymer, substituting the polymer on one or more terminal ends with a functional group to form an intermediate polymer, dissolving a Li salt in an ionic liquid solvent to form an ionic liquid solution, exposing the ionic liquid solution and, optionally, oxide nanoparticles, to the intermediate polymer; and forming a crosslinked polymer electrolyte from the intermediate polymer and the ionic liquid solution. Exemplary photo-crosslinking techniques are provided below. Any of the techniques below may be used to crosslink polymers in accordance with the methods described herein.

Crosslinked Polymer Formation

As noted above, in various exemplary embodiments, the electrolyte can include a crosslinked polymer which has been crosslinked by means of a photo-activated chemical reaction.

In one exemplary embodiment, the crosslinked polymer may be formed by photochemical generation of a reactive group at the end of a precursor polymer chain(s) which subsequently reacts to crosslink adjacent polymer chains. For example, one such reaction comprises adding at least one photoactive group to a polymer through chemical modification to create a telechelic polymer, and exposing the telechelic polymer to radiative energy (for example, ultraviolet light) to generate reactive groups which then crosslink adjacent polymer chains. As will be understood, while telechelic polymers are commonly linear and difunctional, alternative branched, star, brush, or other multi-armed polymer structures can also be used, provided that ends of the polymer chain are generally functionalized.

Exemplary photo-activated functional groups suitable for use in the photo-activated cross-linking reaction above include azide groups and isocyanate groups (which generate reactive nitrenes upon photodecomposition) and diazinne groups (which generate reactive carbenes upon photodecomposition). However, any photoactive group which may be added to the polymer by chemical modification to generate a telechelic polymer, which can then form a crosslinked polymer when exposed to radiative energy, are within the scope of the present disclosure.

As will be understood, a crosslinked electrolyte can be formed in bulk, in a thin layer, in multiple stacked thin layers, or in alternation with thin layers of differing composition or physical properties. Individual layers can be of any thickness, but commonly are from 10 to 1000 microns thick. In certain embodiments, manufacturability can be enhanced by selecting polymers that can be spread as a paste or a thin film on an electrode before crosslinking.

The crosslinked material can be employed in various applications, including but not limited to high temperature applications, including military battery systems, avionic batteries, automotive batteries, downhole or borehole batteries for oil and gas exploration, and generally any electrochemical systems required to operate or be stored in high temperature environments.

Examples

The following are but particular examples of specific embodiments, and should not be construed as limiting.

(1) Preparation of Crosslinked Polymer Composite Electrolyte by Photochemical Reaction in a "One-Step" Process Crosslinked polymers may be formed using photochemical activation of appropriate functional groups. First, a telechelic polymer is formed. Then, the telechelic polymer is crosslinked, with conditions created such that the bulk of crosslinking occurs between chain ends rather than at sites between the chains. In an exemplary reaction using PEO as a selected polymer, the following electrolyte preparation steps were taken:

A short chained (Mw~20,000 Da) diazido-PEO is manufactured or obtained commercially. Suitable molecular weight diazido-PEO can range from 1000 to 1,000,000 Da, and in this embodiment all of the material is provided to be substantially the same molecular weight to promote a relatively constant nanopore size for the polymer composite. For 20,000 Mw PEO this nanopore size is approximately 200 nm. The diazido-PEO was mixed with a suitable amount of Li salt containing an ionic liquid in anhydrous atmosphere. In selected embodiments, oxide nanoparticles such as $SiO_2$ can be added to improve electrochemical and mechanical properties at this time. The mixture was homogenized in a mortar and pestle, and heated at 70° C. to melt. The melted mixture was poured on to a Teflon sheet under an Ar atmosphere, forming a paste that was exposed to UV radiation using a 450 W medium pressure mercury arc lamp for a certain amount of time to photo-crosslink. Typical duration for UV exposure ranged from 3-15 hours. The crosslinked films were then sandwiched between two electrodes for making electrochemical cells.

In other embodiments, the electrolyte mixture may be poured or spread on to a Li sheet, a conductive element, structure, or material, including but not limited to a metallic material such as an aluminum or copper sheet, or any suitable coated electrode. The mixture is then irradiated in place to form an electrolyte film directly on the surfaces of electrode material, ensuring the composite electrolyte maintains good contact with the electrode.

Typical components and their concentrations ranges useful in the composite electrolytes described are PEO (Mw=20,000 Da) 20-40 wt %, LiTFSI 5-20 wt %, BMP-TFSI 40-60 wt %, $SiO_2$ 3-10 wt %. One specific, although not limiting, example is PEO (Mw=20,000 Da) 30 wt %, LiTFSI 12 wt %, BMP-TFSI 51 wt %, $SiO_2$ 7 wt %.

Frequently, compositions are described in the present invention as $PEO_nLiXx=IL$ whereby n represents the molar ratio of PEO repeat unit ($CH_2CH_2O$) to Li salt, X represents the Li salt counter-ion and x represents the molar ratio of ionic liquid to Li salt respectively. Thus, $PEO_{15}LiTFSIx=3$ BMP-TFSI corresponds to a mixture of PEO, LiTFSI and BMP-TFSI of 32 wt %, 13 wt % and 55 wt %, respectively.

(2) Preparation of Crosslinked Polymer Composite Electrolyte by Photochemical Reaction in a "Two-Step" Process A short chained (Mw~20,000 Da) diazido-PEO is manufactured or obtained commercially. Suitable molecular weight diazido-PEO can range from 1000 to 1,000,000 Da, and in this embodiment all of the material is provided to be substantially the same molecular weight to promote a relatively constant nanopore size for the polymer composite. The diazido-PEO was heated at 70° C. to melt. The melted mixture was poured onto a Teflon sheet under an Ar atmosphere and exposed to UV radiation using a 450 W medium pressure mercury arc lamp for a certain amount of time to photocrosslink. Typical duration for UV exposure ranged from 3-15 hours. This crosslinked film was then exposed, in anhydrous atmosphere, to a suitable amount of solution of Li salt in an ionic liquid. In selected embodiments, oxide nanoparticles such as $SiO_2$ can be added to the solution to improve electrochemical and mechanical properties at this time. After suitable time passed, the resulting material was observed to have incorporated the majority of the Li salt solution, and was removed from the container, affording a solid composite electrolyte suitable for use in an electrochemical cell.

(3) Conductivity of Crosslinked Composite Electrolytes

Figure 2:
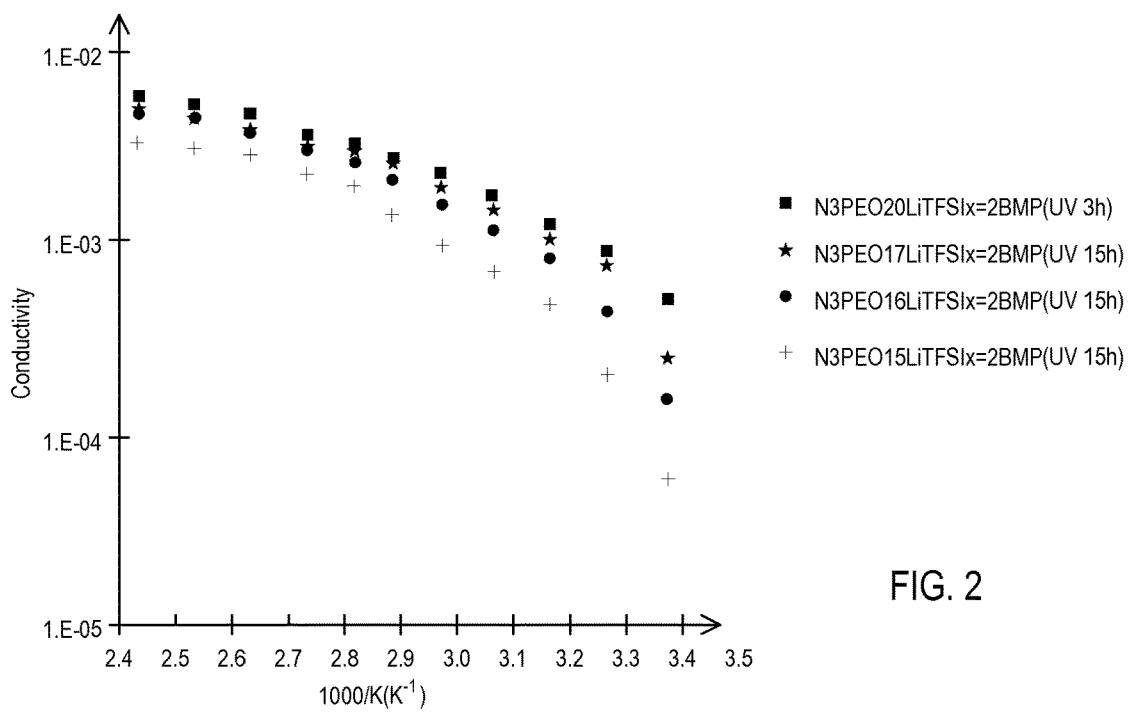
FIG. 2 illustrates the conductivity of several exemplary compositions of photocross-linked telechelic diazido-PEO, Li salt and ionic liquid.

FIG. 2 is a graph showing the conductivity of several exemplary compositions of photocross-linked telechelic diazido-PEO, Li salt and ionic liquid, measured by electrochemical impedence spectroscopy after sandwiching the composite electrolyte between two stainless steel blocking electrodes in a coin cell, at various operating temperatures.

FIG. 3 shows the conductivity of several exemplary compositions of photocross-linked telechelic diazido-PEO, Li salt, ionic liquid and $SiO_2$ nanoparticles, measured by electrochemical impedance spectroscopy after sandwiching the composite electrolyte between two stainless steel blocking electrodes in a coin cell, at various operating temperatures.

(4) Thermal Stability of Li-Containing Crosslinked Electrolyte

FIG. 4 is a graph showing a thermal gravimetric analysis (TGA) of a representative electrolyte formed from cross-linking diazido-PEO in the presence of LiTFSI, indicating the composite electrolyte is stable up to at least 250° C.

(5) Conductivity and Li Transference of Li Cation in Crosslinked Composite Electrolytes FIG. 5 is a table showing the Li transference number of three exemplary compositions of cross-linked telechelic diazido-PEO, Li salt and ionic liquid composite electrolytes, determined by the method of Evans et al., *Polymer,* 28 (1987) 2324-2328.

(6) Cycling Stability of Symmetric Li/Electrolyte/Li Cells

FIG. 6 is a graph shows a typical galvanostatic plating/stripping response for a symmetric Li cell with cross-linked telechelic diazido-PEO, Li salt and ionic liquid composite electrolyte, cycled at 0.1 mA/cm$^2$ at 60° C. A full plating/stripping cycle took 4 hours, and the cell was cycled for over 120 days without shorting, before being removed for cell autopsy. No evidence of dendrite formation under these conditions was observed by electron microscopy.

(7) Cycling Performance of Li/Electrolyte/Cathode Full Cells

Figure 7:
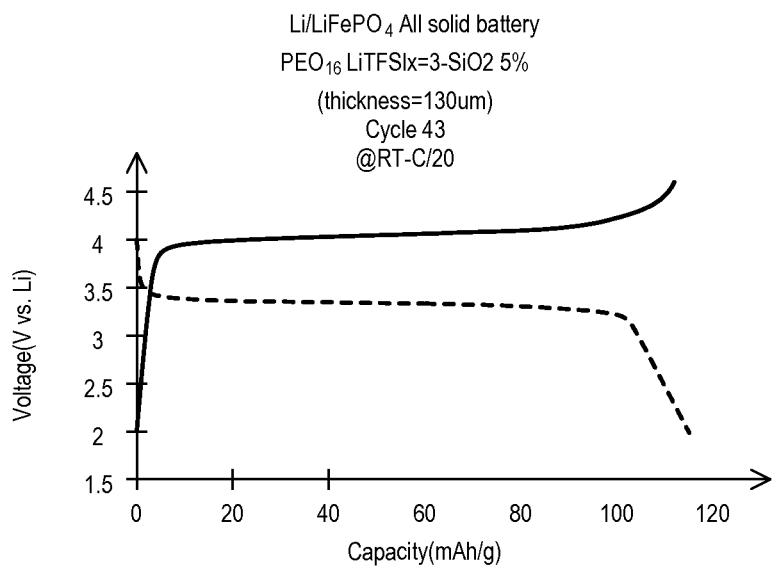
FIG. 7 illustrates representative charge/discharge behavior of Li/electrolyte/$LiFePO_4$ cells made with electrolytes described in accordance with embodiments at room temperature.

FIG. 7 is a graph showing a charge-discharge curve (43$^{rd}$ cycle) for a Li/electrolyte/LiFePO$_4$ cell at room temperature, with cross-linked telechelic diazido-PEO, Li salt and ionic liquid composite electrolyte PEO$_{16}$LiTFSIx=3-SiO$_2$ 5%. Good performance of this cell is observed at appreciable rates (C/20) at room temperature, arising from the greater ionic conductivity of the composite electrolyte when compared with other PEO/Li salt solid electrolytes.

Figure 8:
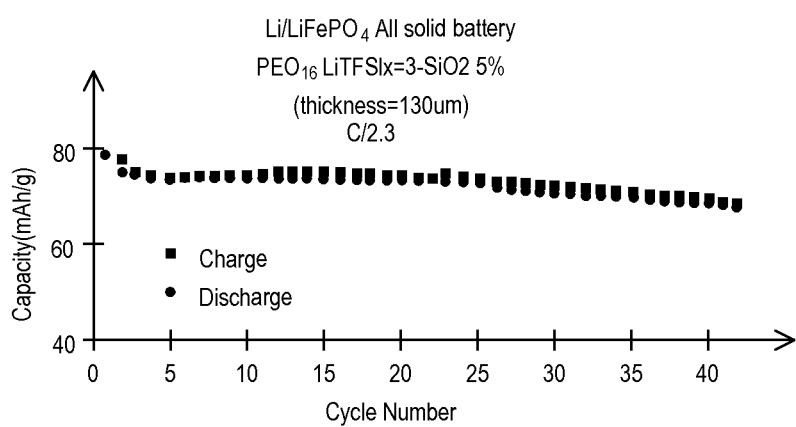
FIG. 8 illustrates representative cycling behavior of Li/electrolyte/$LiFePO_4$ cells made with electrolytes described in accordance with embodiments at 60° C.

FIG. 8 is a graph showing cycling data for a Li/electrolyte/LiFePO$_4$ cell at 60° C., with cross-linked telechelic diazido-PEO, Li salt and ionic liquid composite electrolyte PEO$_{16}$LiTFSIx=3-SiO$_2$ 5%. Good performance of this cell is observed at high rate (C/2.3) at this temperature, with excellent capacity retention upon cycling.

The terms and expressions which have been employed herein are used as terms of description and not of limitation, and there is no intention in the use of such terms and expressions of excluding any equivalents of the features shown and described or portions thereof. It is recognized that various modifications are possible within the scope of the invention claimed. Thus, although the present invention has been specifically disclosed in various embodiments, optional features, modification and variation of the concepts herein disclosed may be resorted to by those skilled in the art, and such modifications and variations are considered to be within the scope of this invention as defined by the claims. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. All ionic forms of ionizable molecules and salts thereof are intended to be included in the disclosure herein. With regard to salts of the compounds herein, one of ordinary skill in the art can select from among a wide variety of available counterions those that are appropriate for preparation of salts of this invention for a given application. In specific applications, the selection of a given cation or cation for preparation of a salt may result in increased or decreased solubility of that salt. Every formulation or combination of components described or exemplified herein can be used to practice the invention, unless otherwise stated. Whenever a range is given in the specification, for example, a temperature range, a time range, or a composition or concentration range, all intermediate ranges and subranges, as well as all individual values included in the ranges given are intended to be included in the disclosure.

What is claimed is:

1. A composite electrolyte comprising:
a crosslinked polymer formed from telechelic precursor polymers having at least two photoactivatable end functional groups, wherein the telechelic precursor polymers have a molecular weight before crosslinking of between 1,000 and 1,000,000 Daltons (Da); and a lithium (Li) salt, wherein the telechelic precursor polymers comprise diazido-PEO; and
an ionic liquid solvent.

2. The composite electrolyte of claim 1, wherein the telechelic precursor polymers have the same molecular weight.

3. The composite electrolyte of claim 1, wherein the telechelic precursor polymers have a molecular weight before crosslinking of 20,000 Daltons and a constant nanopore size of 200 nm.

4. The composite electrolyte of claim 1, wherein the crosslinked polymer forms a constant nanopore structure.

5. The composite electrolyte of claim 1, further comprising oxide nanoparticles of size such that at least one dimension is <1 µm.

6. The composite electrolyte of claim 1, wherein the telechelic precursor polymers have the same molecular weight and composition.

7. An electrochemical cell, comprising:
an anode that can accommodate lithium (Li);
a cathode; and
a composite electrolyte comprising an ionic liquid solvent and having a crosslinked polymer formed from a precursor telechelic polymer with at least two photoactivatable end groups, wherein the precursor telechelic polymers have a molecular weight between 1,000 and 1,000,000 Daltons, wherein the telechelic precursor polymers comprise diazido-PEO.

8. A battery, comprising:
a housing formed to enclose one or more electrochemical cells; wherein
each electrochemical cell includes an anode comprising lithium (Li);
a cathode; and
a composite electrolyte comprising an ionic liquid solvent and having a crosslinked polymer formed from a precursor telechelic polymer with at least two photoactivatable end groups, wherein the precursor telechelic polymers have a molecular weight between 1,000 and 1,000,000 Daltons, wherein the telechelic precursor polymers comprise diazido-PEO.

9. A method of making an electrolyte comprising the steps of:
  introducing a solution of lithium (Li) salt and ionic liquid to a mixture comprising telechelic precursor polymers having at least two photoactivatable end functional groups, wherein the telechelic precursor polymers comprise diazido-PEO; and
  forming a crosslinked polymer from a precursor telechelic polymer by photochemical reaction.

10. The method of claim 9, wherein the introducing step is followed by a heating and homogenization step to form a paste.

11. The method of claim 9, wherein the step of forming a crosslinked polymer electrolyte further comprises positioning the precursor mixture on an electrode or conductive structure prior to forming the crosslinked polymer by photochemical reaction.

12. The method of claim 9, wherein the introduction step is performed after the photochemical reaction step.

13. A method of making an electrolyte, comprising the steps of:
  providing a precursor telechelic polymer with at least two photoactivatable end groups; and
  forming a crosslinked polymer by photochemically reacting the precursor telechelic polymer in the presence of a lithium (Li) salt, an ionic liquid, and solid particles, wherein the telechelic precursor polymers comprise diazido-PEO.

14. The method of claim 13, wherein the precursor telechelic polymer is blended from polymeric materials having distinct molecular weights.

15. The method of claim 13, wherein solid particles are sized to have at least one dimension less than 1 micron.

* * * * *